(12) United States Patent
Isafushi et al.

(10) Patent No.: US 10,543,796 B2
(45) Date of Patent: Jan. 28, 2020

(54) PROTECTION DEVICE FOR VEHICLE ELECTRICAL COMPONENT

(71) Applicant: Honda Motor Co., Ltd., Tokyo (JP)

(72) Inventors: Tsutomu Isafushi, Saitama (JP);
Yoshikazu Mukaiyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 49 days.

(21) Appl. No.: 16/012,770

(22) Filed: Jun. 20, 2018

(65) Prior Publication Data

US 2019/0001898 A1 Jan. 3, 2019

(30) Foreign Application Priority Data

Jul. 3, 2017 (JP) .................................. 2017-130264

(51) Int. Cl.
*B60R 16/04* (2006.01)
*F02N 11/10* (2006.01)
*H01M 2/10* (2006.01)
*B60R 11/00* (2006.01)

(52) U.S. Cl.
CPC .............. *B60R 16/04* (2013.01); *F02N 11/10* (2013.01); *H01M 2/1083* (2013.01); *B60R 2011/0038* (2013.01); *H01M 2220/20* (2013.01)

(58) Field of Classification Search
CPC ............ B60R 16/04; B60R 2011/0038; H01M 2/1083; F02N 11/10; F02N 11/00
USPC ........................................................ 180/271
See application file for complete search history.

(56) References Cited

FOREIGN PATENT DOCUMENTS

JP          2015-63904        4/2015
WO       WO-9940316 A1 *  8/1999   .............. F02N 11/12

* cited by examiner

*Primary Examiner* — Keith J Frisby
(74) *Attorney, Agent, or Firm* — JCIPRNET

(57) ABSTRACT

Provided is a protection device for a vehicle electrical component capable of preventing damage to a predetermined electrical component due to hitting by a battery, and also capable of reducing noise/vibration. The disclosure is a protection device which protects a starter in a vehicle in which a battery and the starter are disposed to face each other with a space therebetween in an engine room of the vehicle in which components constituting a power plant or a power train are supported by a vehicle body via a mount and a bracket. The skid block serving as the protection device includes bracket attachment portions attached to a transmission attachment portion of the bracket, and a skid block main body extending upward from the bracket attachment portions and gradually away from the bracket extension portion, and having a distal end portion positioned between the battery and the starter and facing the battery.

6 Claims, 4 Drawing Sheets

PROTECTION DEVICE FOR VEHICLE ELECTRICAL COMPONENT

CROSS-REFERENCE TO RELATED APPLICATION

This application claims the priority of Japan patent application serial no. 2017-130264, filed on Jul. 3, 2017. The entirety of the above-mentioned patent application is hereby incorporated by reference herein and made a part of this specification.

BACKGROUND

Technical Field

The disclosure relates to a protection device for a vehicle electrical component which protects a predetermined electrical component in a vehicle in which a battery and the electrical component are disposed to face each other with a space therebetween in an engine room of the vehicle.

Description of Related Art

Generally, an engine and a transmission are disposed in an engine room of a vehicle, and these are supported by a mount fixed to a vehicle body frame via a bracket. By interposing a mount between an engine and a vehicle body frame and between a transmission and the vehicle body frame, noise and vibration due to an operation of the engine and an operation of the transmission are absorbed by the mount and transfer of the noise and vibration to the vehicle body is greatly reduced.

Also, various types of electrical components, specifically, a starter for starting the engine, a battery for supplying/charging electricity, and the like, are installed in an engine room, and as a case in which a starter is provided above a transmission, for example, one described in Patent Document 1 (Japanese Laid-open No. 2015-63904) is known.

In Patent Document 1, the starter is attached to a transmission housing provided as a housing between the engine and the transmission, and is also connected to a transmission case which is a housing of the transmission via a metal long plate and an L-shaped metal fitting. Specifically, one half of the long plate is welded to a starter case serving as a housing of the starter, and one piece of the L-shaped metal fitting is fixed to a predetermined portion of the transmission case with bolts. Thus, the other half of the long plate and the other piece of the L-shaped metal fitting are fixed with bolts.

In an engine room as described above, where a battery is disposed in front of a starter, for example, when the battery is pushed rearward at the time of a vehicle collision, the battery may hit and damage the starter. Also, in vehicles, in general, reduction of noise/vibration caused by an operation of the engine and an operation of the transmission is always required.

SUMMARY

An embodiment of the disclosure according to claim 1 provides a protection device for a vehicle electrical component which protects an electrical component in a vehicle in which a battery 4 and a predetermined electrical component (a starter 3) are disposed to face each other with a space therebetween in an engine room ER of the vehicle in which components (an engine 1 and a transmission 2 in the present embodiment (hereinafter the same shall apply in this section)) constituting a power plant or a power train are supported by a vehicle body via a mount 5 and a bracket 6, in which the bracket has a mount attachment portion 6a attached to the mount fixed to the vehicle body, a bracket extension portion 6n extending downward from the mount attachment portion, and a constituent component attachment portion (a transmission attachment portion 6c) provided at a lower end portion of the bracket extension portion and attached to a component constituting the power plant or the power train, the protection device for a vehicle electrical component including a protection block (a skid block 8) attached to the bracket and configured to protect the electrical component, in which the protection block has a bracket attachment portion (attachment portions 8a and 8b) attached to the constituent component attachment portion, and a protection block main body (skid block main body 8c) extending upward from the bracket attachment portion and gradually away from the bracket extension portion, and having a distal end portion positioned between the battery and the electrical component and facing the battery.

DESCRIPTION OF THE EMBODIMENTS

Figure 1:
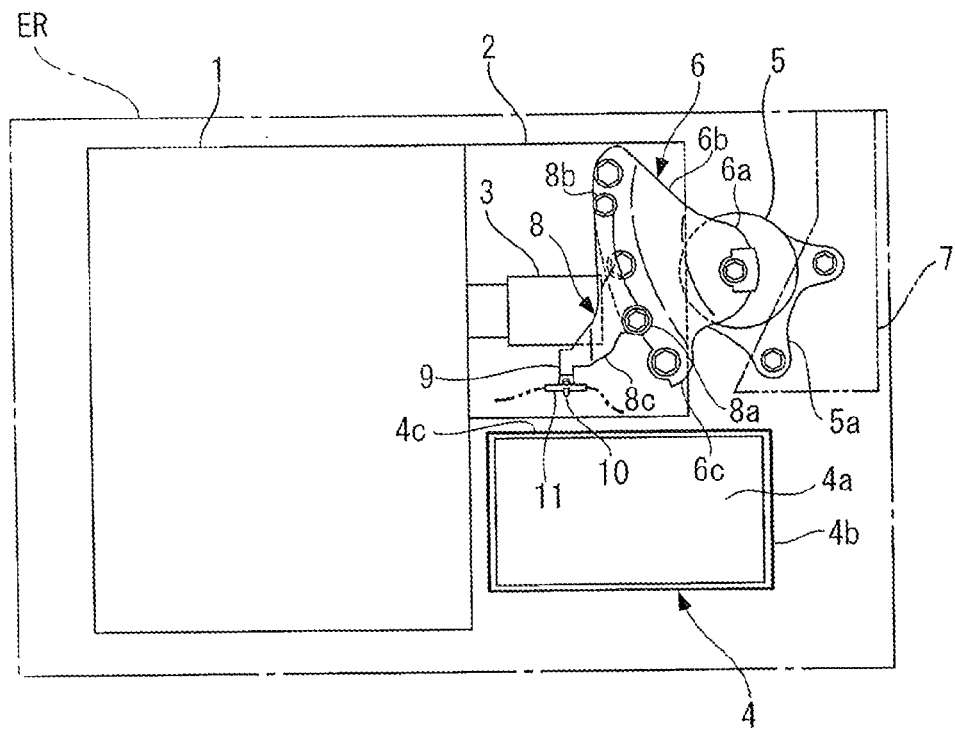
FIG. 1 is a plan view illustrating an inside of an engine room of a vehicle to which a protection device for a vehicle electrical component according to one embodiment of the disclosure is applied.

The embodiments of the disclosure provide a protection device for a vehicle electrical component capable of preventing damage to a predetermined electrical component due to hitting by a battery, and also capable of reducing noise/vibration.

According to the configuration in the disclosure according to claim 1, in the engine room of the vehicle, components constituting the power plant or the power train are supported by the vehicle body via a mount fixed to the vehicle body and a bracket attached to the mount. Also, in the engine room, the battery and the predetermined electrical component are disposed to face each other with a space therebetween. The bracket has the mount attachment portion, the bracket extension portion and the constituent component attachment portion, and the protection block for protecting the electrical component is attached to the bracket. Specifically, the protection block is attached to the constituent component attachment portion of the bracket via the bracket attachment portions, and the protection block main body extends upward from the bracket attachment portions and gradually away from the bracket extension portion, and has a distal end portion positioned between the battery and the electrical component and facing the battery. With the protection block configured as described above, even when the battery moves to the electrical component side due to an action of an external force, for example, at the time of a vehicle collision, the battery comes into contact with a distal end portion of the protection block main body and thus the battery can be prevented from hitting the electrical component. Therefore, the protection block prevents the battery from hitting the electrical component at the time of a vehicle collision, and thereby damage to the electrical component is prevented. In addition, when the protection block configured as described above is attached to the bracket, as will be described later, it has been confirmed that noise/vibration during operation of the engine are reduced.

In one or some exemplary embodiments of the disclosure according to claim 2, in the protection device for a vehicle electrical component according to claim 1, a flat facing surface (front surface 9b) disposed substantially parallel to a surface of the battery on the electrical component side may be provided in the distal end portion of the protection block main body.

According to this configuration, since the flat facing surface provided at the distal end portion of the protection block main body is disposed substantially in parallel to the surface of the battery on the electrical component side, it is possible to reduce impact and damage when the battery hits the facing surface as compared with a case in which the distal end portion of the protection block main body is pointed, for example.

In one or some exemplary embodiments of the disclosure according to claim 3, in the protection device for a vehicle electrical component according to claim 2, the battery may include a battery main body 4a and a support case 4b supporting the battery main body from below, in which the support case may include a wall portion (rear wall 4c) facing the facing surface of the protection block main body.

According to this configuration, the battery main body is supported by the support case from below, and the wall portion of the support case faces the facing surface of the protection block main body. Therefore, at the time of vehicle collision, when the battery hits the protection block, the wall portion of the support case first hits the protection block. As a result, damage to the battery main body can be reduced as compared with a case in which the battery main body directly hits the protection block.

In one or some exemplary embodiments of the disclosure according to claim 4, in the protection device for a vehicle electrical component according to any one of claims 1 to 3, the electrical component may be a starter 3 which starts an engine.

According to this configuration, since an electrical component protected by the protection block is a starter and the battery can be prevented from hitting the starter at the time of a vehicle collision, the starter can be prevented from being damaged, and thereby it is possible to ensure starting of the engine by the starter after collision.

Hereinafter, embodiments of the disclosure will be described in detail with reference to the drawings. FIG. 1 illustrates an inside of an engine room at a front portion of a vehicle to which a protection device for a vehicle electrical component according to one embodiment of the disclosure is applied. As illustrated in FIG. 1, as components constituting a power plant or a power train, an engine 1 serving as a power source of the vehicle and a transmission 2 connected to the right side thereof are installed in an engine room ER of the vehicle. A starter 3 for starting the engine 1 is connected to the engine 1 above the transmission 2.

Further, a battery 4 is installed on the right side of the engine 1 and in front of the starter 3 in the engine room ER. The battery 4 includes a battery main body 4a formed in a box shape and having an electrolyte and an electrode therein, and a support case 4b which supports the battery main body 4a from below. The support case 4b opens upward and is configured such that it can accommodate a lower portion of the battery main body 4a, and includes a rear wall 4c (a wall portion) facing a distal end portion 9 of a skid block 8 to be described below on a back surface side thereof.

The engine 1 and the transmission 2 are supported by a vehicle body frame 7 via a plurality of mounts 5 (only one on the right side is illustrated in FIG. 1) and a bracket 6. The mount 5 is formed in a columnar shape using rubber or the like and has a predetermined configuration that makes it difficult for vibration and noise to be transferred by absorbing the vibration and noise. Further, the mount 5 is fixed to the vehicle body frame 7 with a bolt via an attachment metal fitting 5a.

The bracket 6 is made of a metal and formed into a predetermined shape. Specifically, the bracket 6 includes a mount attachment portion 6a attached to an upper portion of the mount 5, a bracket extension portion 6b that is bent at a left end portion of the mount attachment portion 6a and extends downward by a predetermined length, and a transmission attachment portion 6c (constituent component attachment portion) provided at a lower end portion of the bracket extension portion 6b and attached to the transmission 2 thereunder.

The mount attachment portion 6a of the bracket 6 is fixed to a central portion of an upper surface of the mount 5 with bolts. Further, the bracket extension portion 6b is formed to extend downward and spread in a front-rear direction (in a vertical direction in FIG. 1), and a plurality of ribs are provided to extend in a vertical direction between the mount attachment portion 6a and the transmission attachment portion 6c. Thus, three positions of a front end portion, a central portion, and a rear end portion of the transmission attachment portion 6c are fixed to an upper portion of a case of the transmission 2 with bolts.

Further, the skid block 8 (protection block) made of a metal and formed into a predetermined shape is attached to the transmission attachment portion 6c of the bracket 6. The skid block 8 is for preventing the battery 4 from hitting the starter 3 at the time of a vehicle collision.

Figure 3:
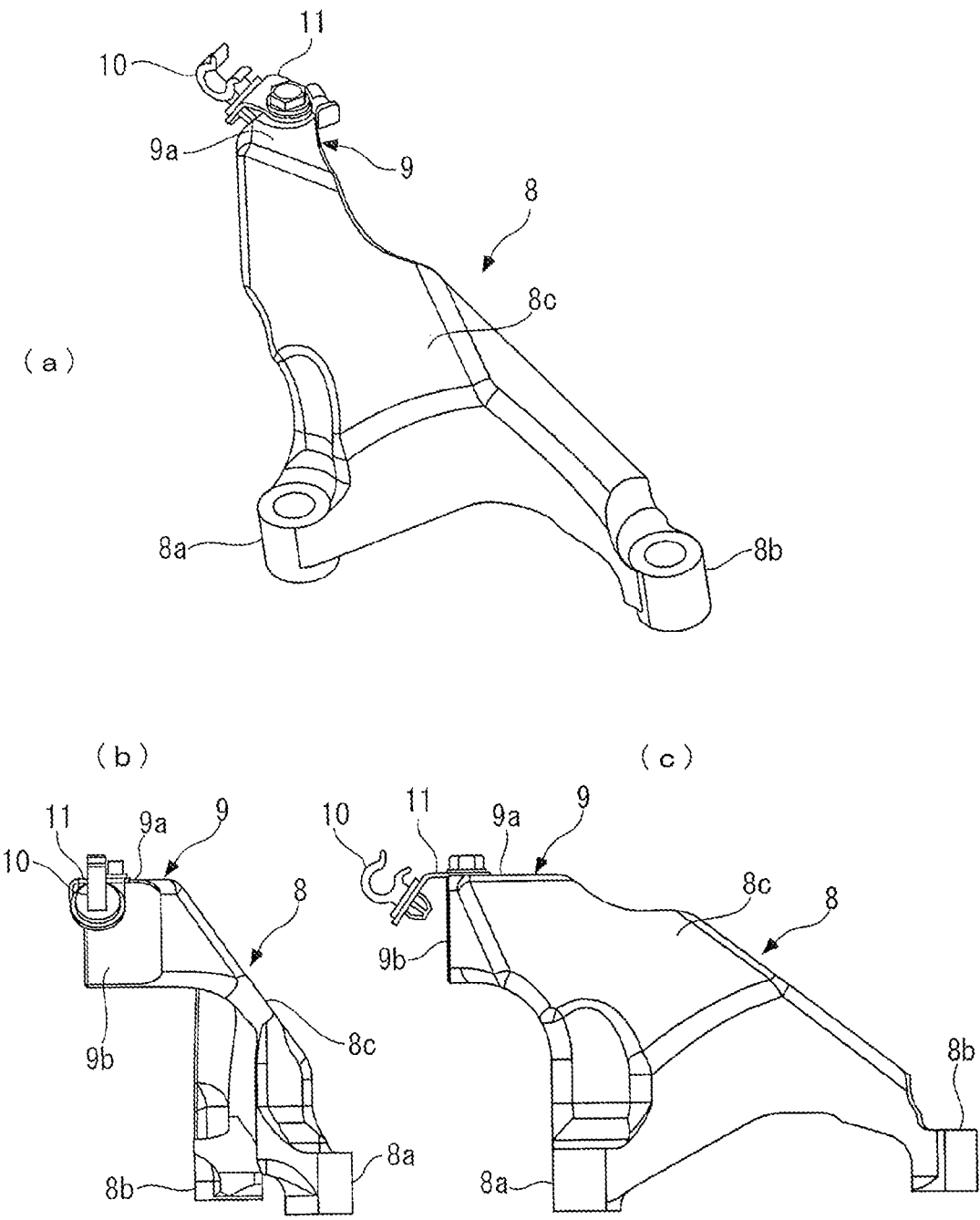
FIG. 3 is a view illustrating the skid block, in which (a) is a perspective view from a bracket side, (b) is a front view, and (c) is a right side view.

As illustrated in FIG. 3, the skid block 8 includes two front and rear attachment portions 8a and 8b (bracket attachment portions) provided at a predetermined interval in a front-rear direction and attached to the transmission attachment portion 6c of the bracket 6, and a skid block main body 8c (protection block main body) formed to extend a predetermined length to a left front upper side from these attachment portions 8a and 8b. Further, the distal end portion 9 of the skid block main body 8c is configured to have a flat upper surface 9a and a flat front surface 9b (facing surface), and the surfaces 9a and 9b form a right angle.

Figure 2:
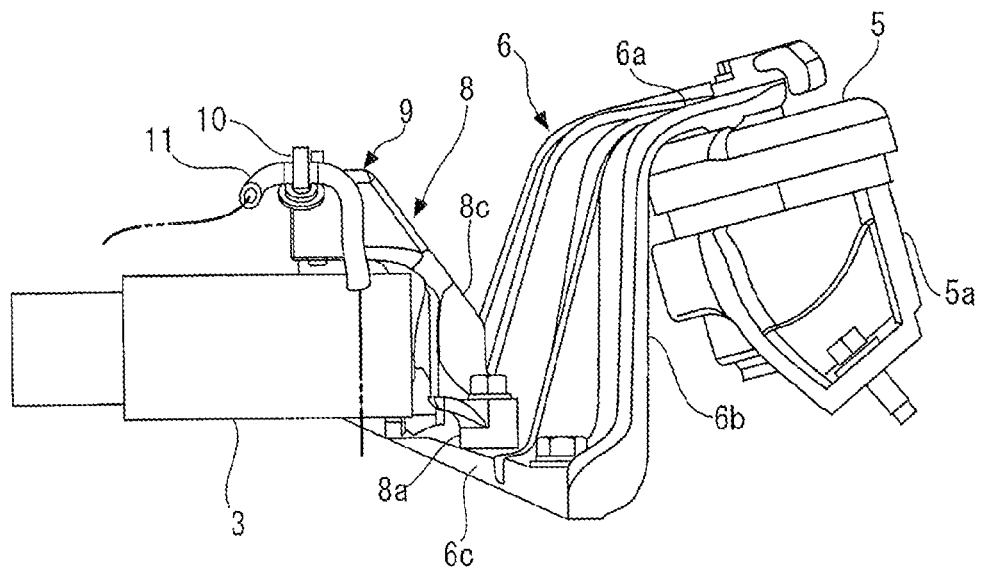
FIG. 2 is a front view illustrating a skid block and its surroundings.

In the skid block 8 configured as described above, as illustrated in FIGS. 1 and 2, the front and rear attachment portions 8a and 8b are fixed to the transmission attachment portion 6c of the bracket 6 with bolts, and the skid block main body 8c extends around from the transmission attachment portion 6C of the bracket 6 to a front of the starter 3 and is inserted between the battery 4 in front and the starter 3 from the right.

Figure 4:
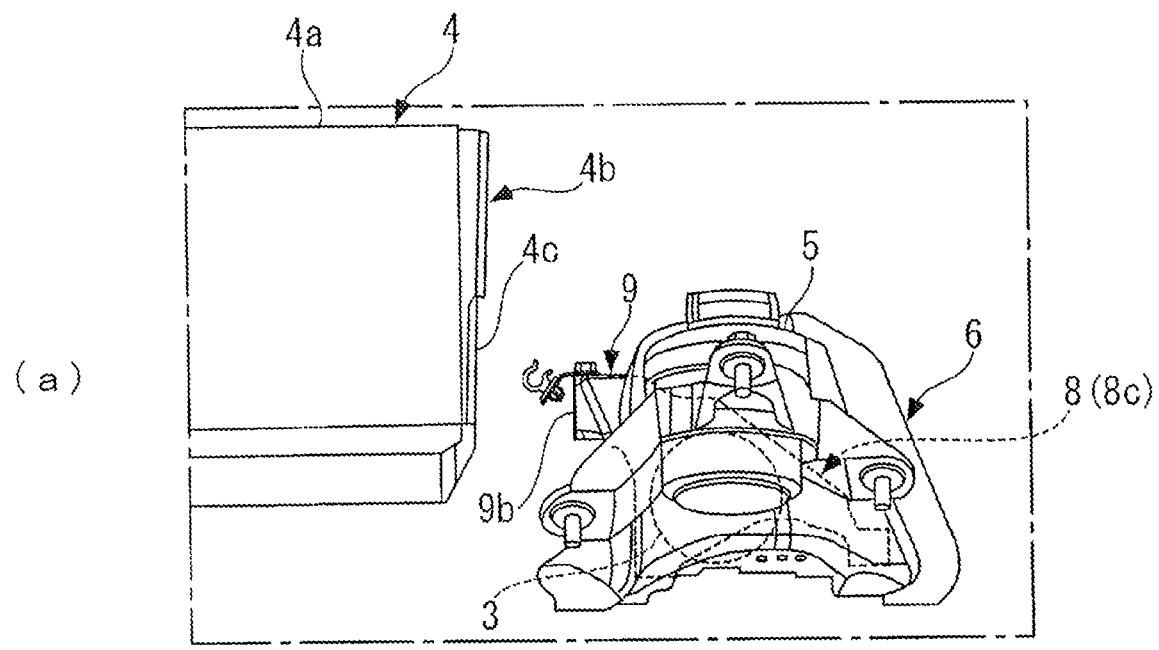
FIG. 4 is a view illustrating the skid block and its surroundings, in which (a) illustrates a state when viewed from the right side, and (b) illustrates a state when viewed from a rear surface side and in which a portion thereof is cut with a vertical plane.
Figure 4:
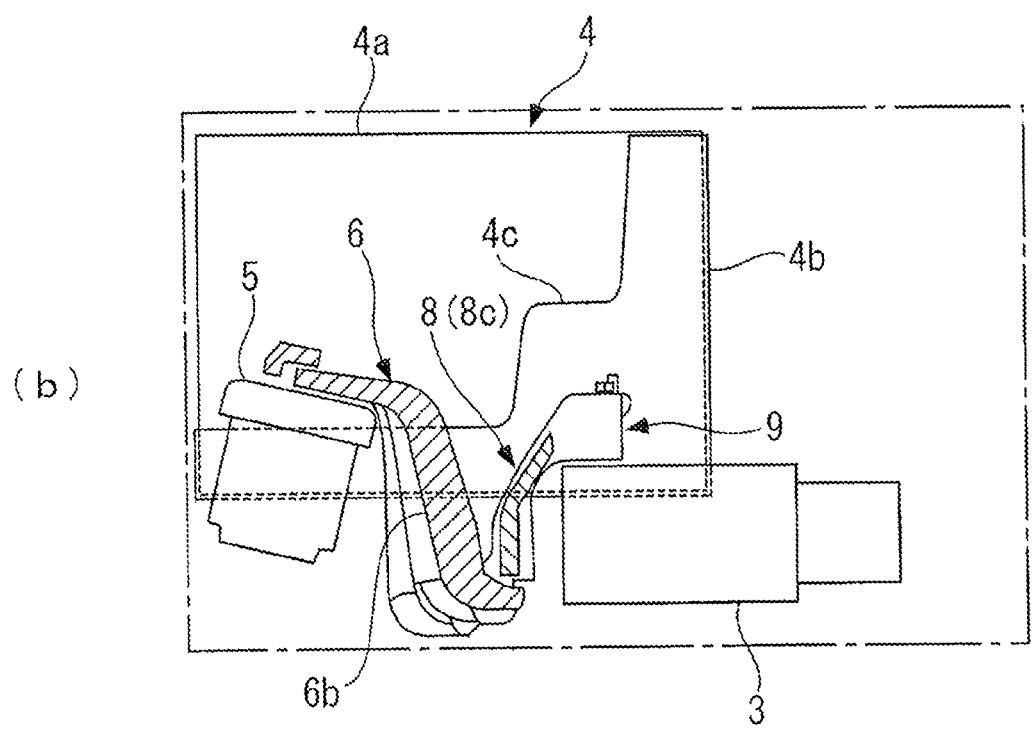

FIG. 4 illustrates the skid block 8 and its surroundings, in which (a) is a state when viewed from the right side and (b) is a state when viewed from a rear surface side and in which a portion thereof is cut with a vertical plane. As illustrated in (a) in FIG. 4, the distal end portion 9 of the skid block main body 8c is positioned between the battery 4 and the starter 3, and in addition, the front surface 9b of the distal end portion 9 is substantially in parallel to the rear wall 4c of the support case 4b supporting the battery main body 4a and faces the rear wall 4c. In addition, as illustrated in (b) in FIG. 4, in the skid block 8 attached to the bracket 6, the skid block main body 8c extends upward from the attachment portions 8a and 8b at a lower end portion thereof and gradually away from the bracket extension portion 6b of the bracket 6.

Further, in the distal end portion 9 of the skid block 8, a clip 10 for supporting a harness, a hose, or the like in the middle thereof is attached to a bolted stay 11. In this clip 10, for example, a hose for bleeding inside air of the transmission 2 may be supported.

With the configuration described above, the starter 3 is protected by the skid block 8 attached to the bracket 6 at the time of a vehicle collision. For example, when a vehicle collides with another vehicle in front of it or a wall, if the battery 4 is moved rearward, the battery 4 hits the distal end portion 9 of the skid block 8 and further movement rearward is prevented. As a result, the battery 4 can be prevented from hitting the starter 3, and damage thereof can be prevented. Further, in this case, when the battery 4 hits the skid block 8, the rear wall 4c of the support case 4b hits the distal end portion 9 of the skid block 8. Thereby, it is possible to prevent the skid block 8 from directly hitting the battery main body 4a, and damage to the battery main body 4a can be prevented.

Figure 5:
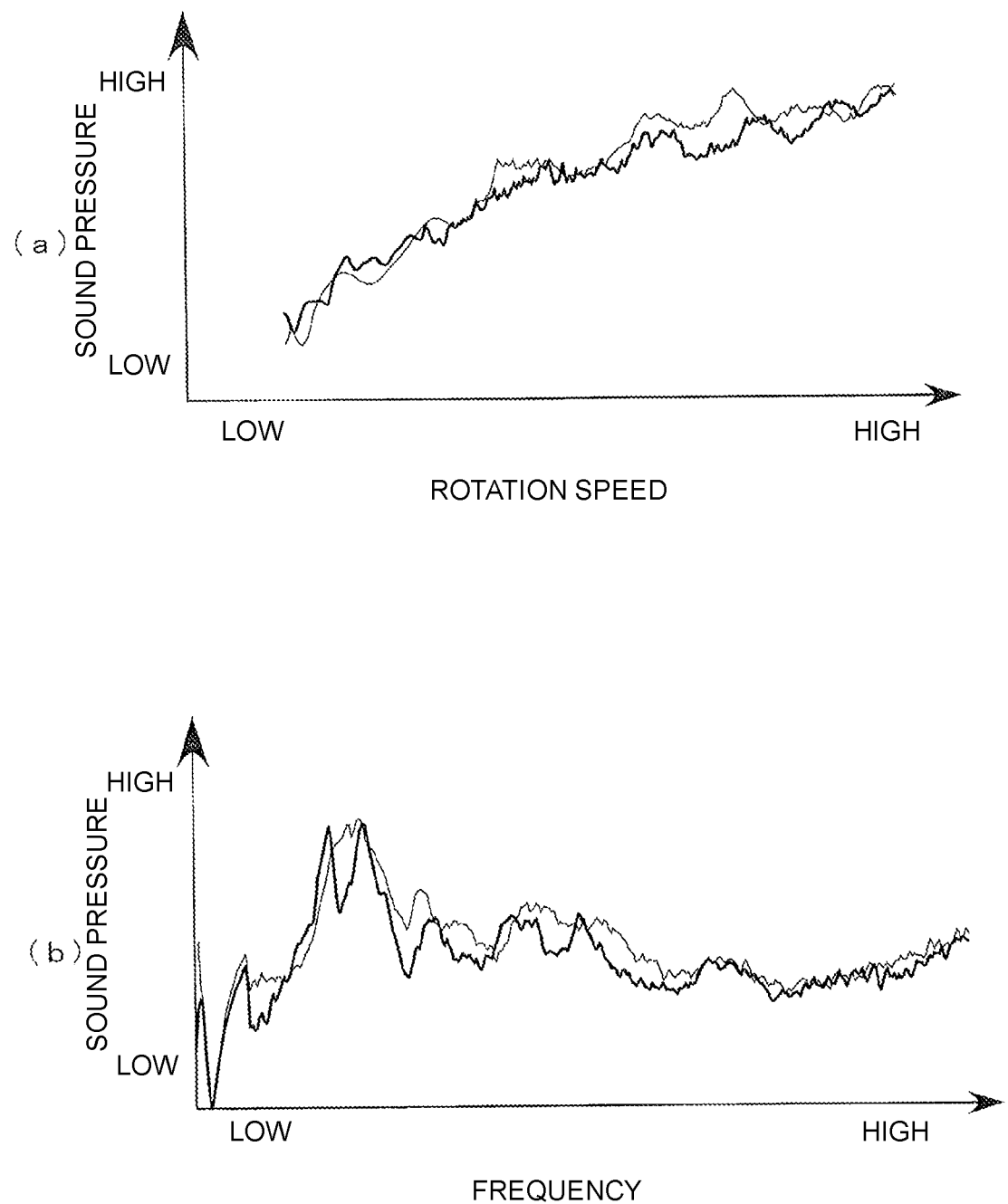
FIG. 5 illustrates results of a noise/vibration test, in which (a) illustrates a relationship between a rotation speed and a sound pressure, and (b) illustrates a relationship between a frequency and a sound pressure.

Further, as described above, it was confirmed that noise/vibration could be reduced when the skid block 8 is attached to the bracket 6. FIG. 5 illustrates test results of a test performed for predetermined noise/vibration with the skid block 8 attached (thick line) and without the skid block 8 (thin line). Specifically, (a) in FIG. 5 illustrates a relationship between a rotation speed of the engine 1 and a sound pressure, and (b) in FIG. 5 illustrates a relationship between a frequency and a sound pressure.

As illustrated in (a) in FIG. 5, in a state in which the skid block 8 was attached, it was ascertained that noise/vibration could be reduced over substantially the entire range from a low rotation speed to a high rotation speed, and particularly, noise/vibration could be further reduced over the range from a middle rotation speed to a high rotation speed of the engine 1. In addition, as illustrated in (b) in FIG. 5, in a state in which the skid block 8 was attached, it was ascertained that noise/vibration could be reduced over substantially the entire range from a low frequency to a high frequency, and particularly, noise/vibration in a middle frequency band could be further reduced.

As described above, according to the present embodiment, when the skid block 8 is attached to the bracket 6, the battery 4 is prevented from hitting the starter 3 at the time of a vehicle collision, and thereby the starter 3 can be prevented from being damaged. In addition, noise/vibration can be reduced as a whole as compared with a case in which the skid block 8 is not provided. In addition, since the rear wall 4c of the support case 4b of the battery 4 faces the distal end portion 9 of the skid block 8, damage to the battery main body 4a can be reduced as compared with a case in which the battery main body 4a directly hits the skid block 8 at the time of a vehicle collision.

The disclosure is not limited to the above-described embodiments, and can be implemented in various modes. For example, although the starter 3 is the electrical component that is protected by the skid block 8 in the embodiment, the disclosure is not limited thereto, and other electrical components installed in the engine room ER may be protected. Further, the case in which the engine room ER in which the engine 1 and the transmission 2 are installed is provided in the front portion of a vehicle has been described in the embodiment, but a vehicle to which the disclosure can be applied is not limited thereto, and the disclosure is also applicable to a vehicle having an engine room in a central portion or a rear portion.

Further, in the embodiment, the engine 1 and the transmission 2 are exemplified as components constituting the power plant or the power train, but the disclosure is not limited thereto, and the disclosure can also be applied to a vehicle including, for example, a motor or battery for an electric vehicle, a fuel cell stack, a power control unit, an inverter, or the like, as components constituting the power plant or the power train. Further, detailed configurations or the like of the skid block 8 illustrated in the embodiment are merely examples, and can be appropriately changed within the scope of the gist of the disclosure.

What is claimed is:

1. A protection device for a vehicle electrical component which protects an electrical component in a vehicle in which a battery and a predetermined electrical component are disposed to face each other with a space therebetween in an engine room of the vehicle in which components constituting a power plant or a power train are supported by a vehicle body via a mount and a bracket, wherein the bracket includes:
    a mount attachment portion attached to the mount fixed to the vehicle body;
    a bracket extension portion extending downward from the mount attachment portion; and
    a constituent component attachment portion provided at a lower end portion of the bracket extension portion and attached to a component constituting the power plant or the power train,
    the protection device for a vehicle electrical component comprising:
    a protection block attached to the bracket and configured to protect the electrical component, wherein
    the protection block includes:
    a bracket attachment portion attached to the constituent component attachment portion; and
    a protection block main body extending upward from the bracket attachment portion and gradually away from the bracket extension portion, and having a distal end portion positioned between the battery and the electrical component and facing the battery.

2. The protection device for a vehicle electrical component according to claim 1, wherein a flat facing surface disposed substantially in parallel to a surface of the battery on the electrical component side is provided in the distal end portion of the protection block main body.

3. The protection device for a vehicle electrical component according to claim 2, wherein:
    the battery includes:
    a battery main body; and
    a support case supporting the battery main body from below, wherein
    the support case includes a wall portion facing the facing surface of the protection block main body.

4. The protection device for a vehicle electrical component according to claim 3, wherein the electrical component is a starter which starts an engine.

5. The protection device for a vehicle electrical component according to claim 2, wherein the electrical component is a starter which starts an engine.

6. The protection device for a vehicle electrical component according to claim 1, wherein the electrical component is a starter which starts an engine.

* * * * *